DATA PROCESSING SYSTEM

Filed July 1, 1958 5 Sheets-Sheet 1

INVENTORS
W.H. THOMAS
E.J. RASER
BY Edgar H. Kent
ATTORNEY

DATA PROCESSING SYSTEM

Filed July 1, 1958 5 Sheets-Sheet 2

July 27, 1965 E. J. RASER ETAL 3,197,738

DATA PROCESSING SYSTEM

Filed July 1, 1958 5 Sheets-Sheet 3

United States Patent Office 3,197,738
Patented July 27, 1965

3,197,738
DATA PROCESSING SYSTEM

Edward J. Raser, Rhinebeck, and Walker H. Thomas, Poughkeepsie, N.Y., assignors to International Business Machines Corporation, New York, N.Y., a corporation of New York Filed July 1, 1958, Ser. No. 745,922
13 Claims. (Cl. 340—172.5)

This invention relates to data processing systems and more particularly to input systems employed in conjunction with data processing machines.

In data processing systems including a computer element the primary limitation on the capacity of the system is frequently the rate at which the computer element can accept and process data which is supplied to it. Where a system includes a multiplicity of data generators which feed information to the computing element for processing, a plurality of the data generators may contain suitable but redundant information. An example of such a system is a position reporting system in which a multiplicity of mobile craft generate signals at predetermined time intervals which are utilized by the data processing system to determine the substantially instantaneous position of each craft. Such a system is disclosed in the copending application Serial No. 609,414, filed September 12, 1956 now Patent No. 2,972,742 in the name of Dan C. Ross, entitled Automatic Position Reporting System and assigned to the same assignee as the present application. As described in that application, a plurality of receiving stations are located in a predetermined configuration. A signal, generated by each mobile craft in its predetermined time slot, is received by a plurality of stations. The time difference between the receipt of the signal by four stations which are related in a known geographical manner can be utilized to ascertain the location of the reporting craft. As more than four stations may and frequently will receive the signal there are a plurality of possible data sources which may be utilized by the computer for making the position locating computation. It is to be noted that the data is of transitory value in the system as it only indicates an instantaneous position of a mobile craft. The position reporting computation must be performed rapidly on each craft supervised by the system and the entire cycle frequently repeated so that current results may be available. All data relative to a specific craft location is superfluous after a computation is completed and therefore is discarded.

The data processing system might permit the central computing element to process the available information in one of several different manners. For example, all of the available information could be processed. This would permit a certain refinement of the results and a check on the accuracy thereof. However, much of the computing operation would, by definition, be repetitive and thus such operation would involve excess and unnecessary use of the valuable computer time. Therefore, systems which incorporate some type of filtering or selection systems are known in the art. However, such systems generally are inflexible, handling data on the basis of non-current criteria.

Accordingly, it is a primary object of the invention to provide an improved input system for use for selectively transmitting incoming data to the associated data processing machine.

Another object of the invention is to provide an input system which selectively transmits data to the associated data processing machine on the basis of results computed by the data processing machine.

A further object of the invention is to provide an input system adapted for use with a data processing machine handling, in a continuous manner, data of a transitory value wherein said input system is adapted to select a data generator on the basis of computed results.

The input system of the preferred embodiment of the invention is adapted to select a data generator which has suitable information and to transfer that information to buffer storage in a preferred manner, making the information available to a computer for processing. If no information is available to indicate a preferred data generator the input system interrogates the data generators in a preferred order and when a generator having appropriate information is discovered that generator is connected to the input system so that the information may be transferred to the computer for processing. When, however, a preferred generator is identified, as by the computer having defined the location of the reporting craft so that it may specify a preferred data generator for interrogating, this information is utilized by the input system to select an appropriate data generator for information transfer.

Certain other features, objects and advantages of the invention will appear as the detailed description of the preferred embodiment proceeds, in conjunction with the drawings, in which:

FIG. 1 graphically represents a positional relationship of receiving stations which feed data to the input system of the preferred embodiment;

Figure 7:
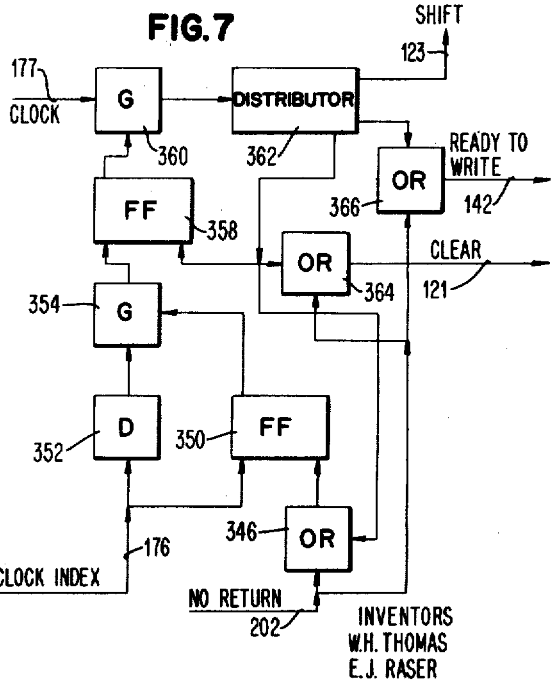
Figure 2:
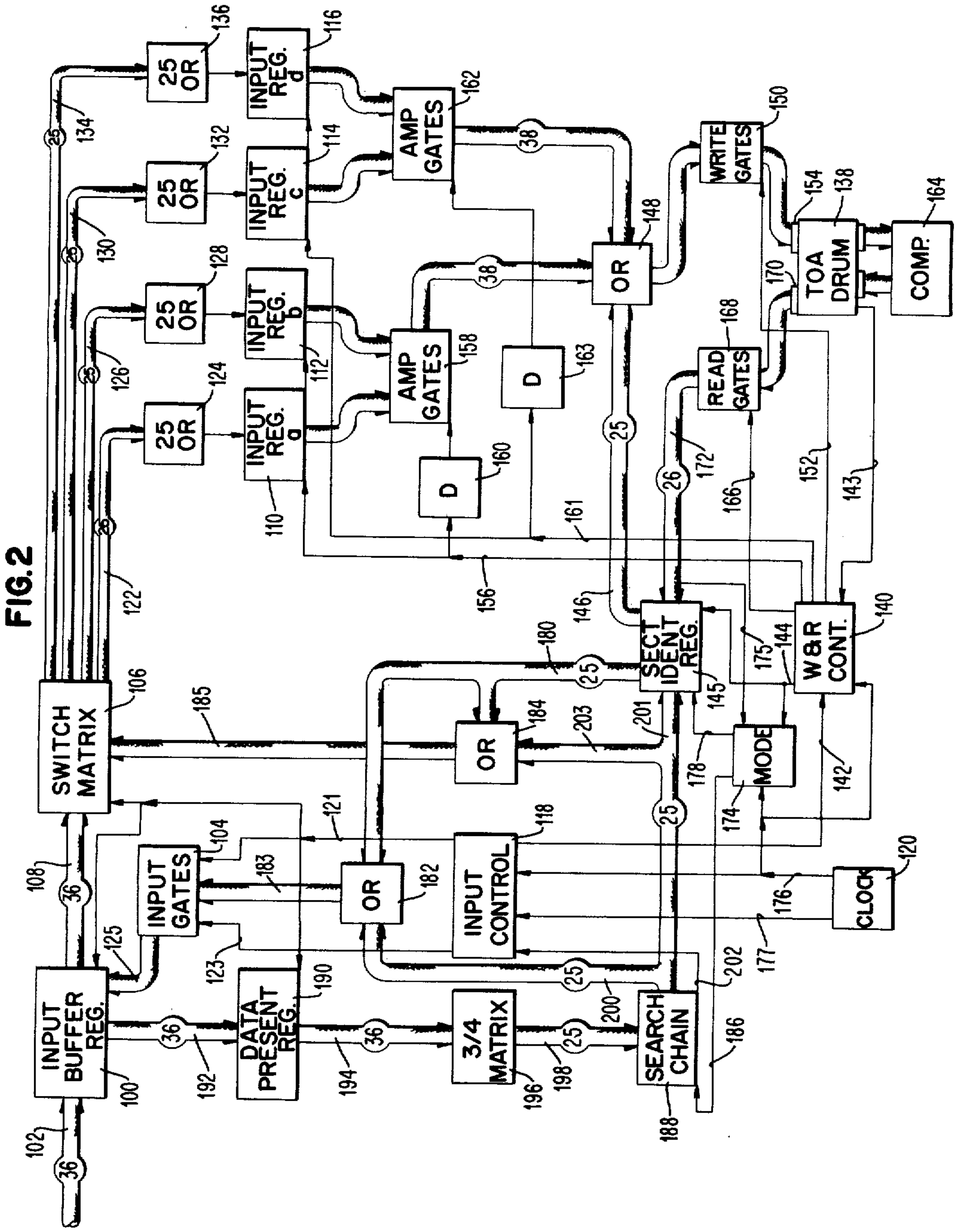
FIG. 2 is a schematic diagram in block form of the input system according to the preferred embodiment of the invention.
Figure 4:
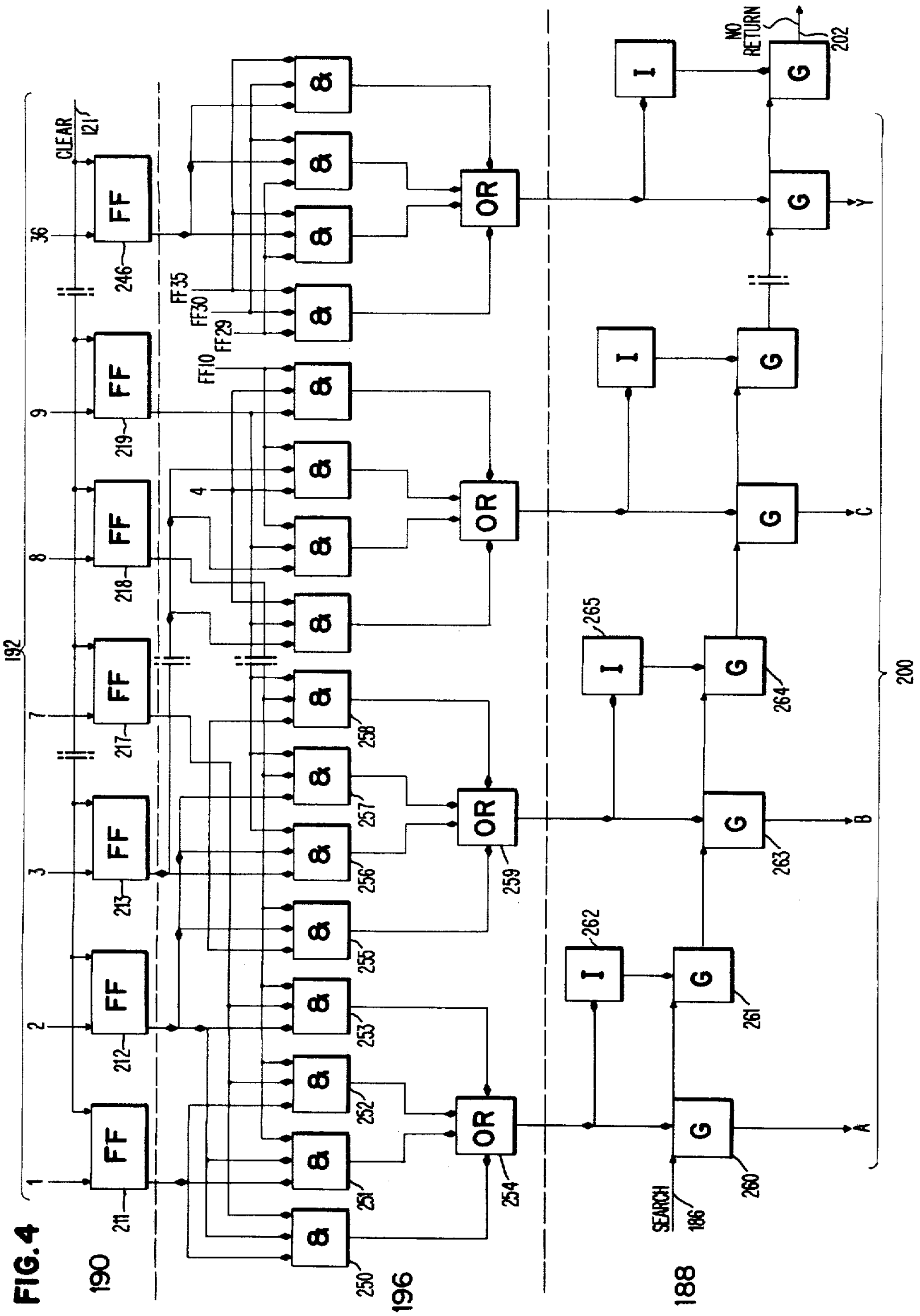
Figure 5:
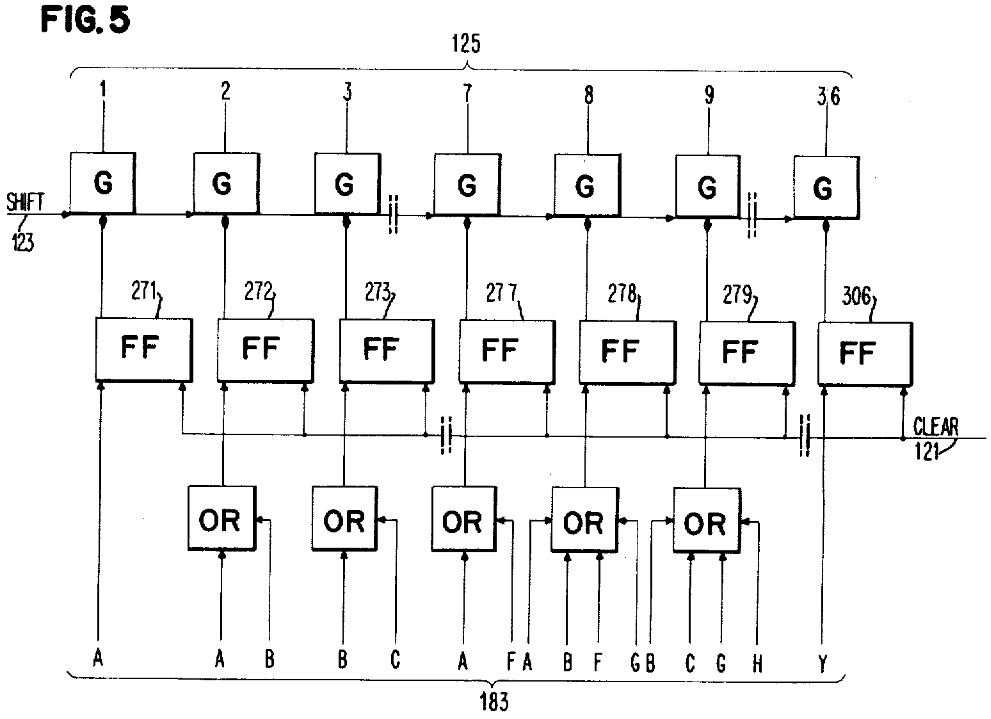
Figure 8:
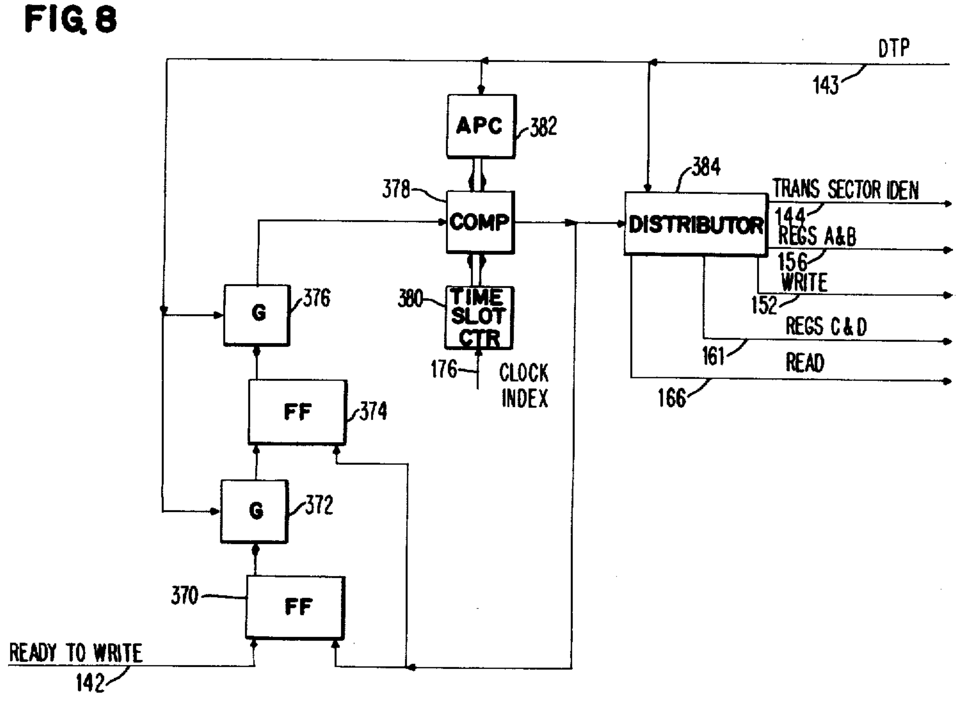
Figure 6:
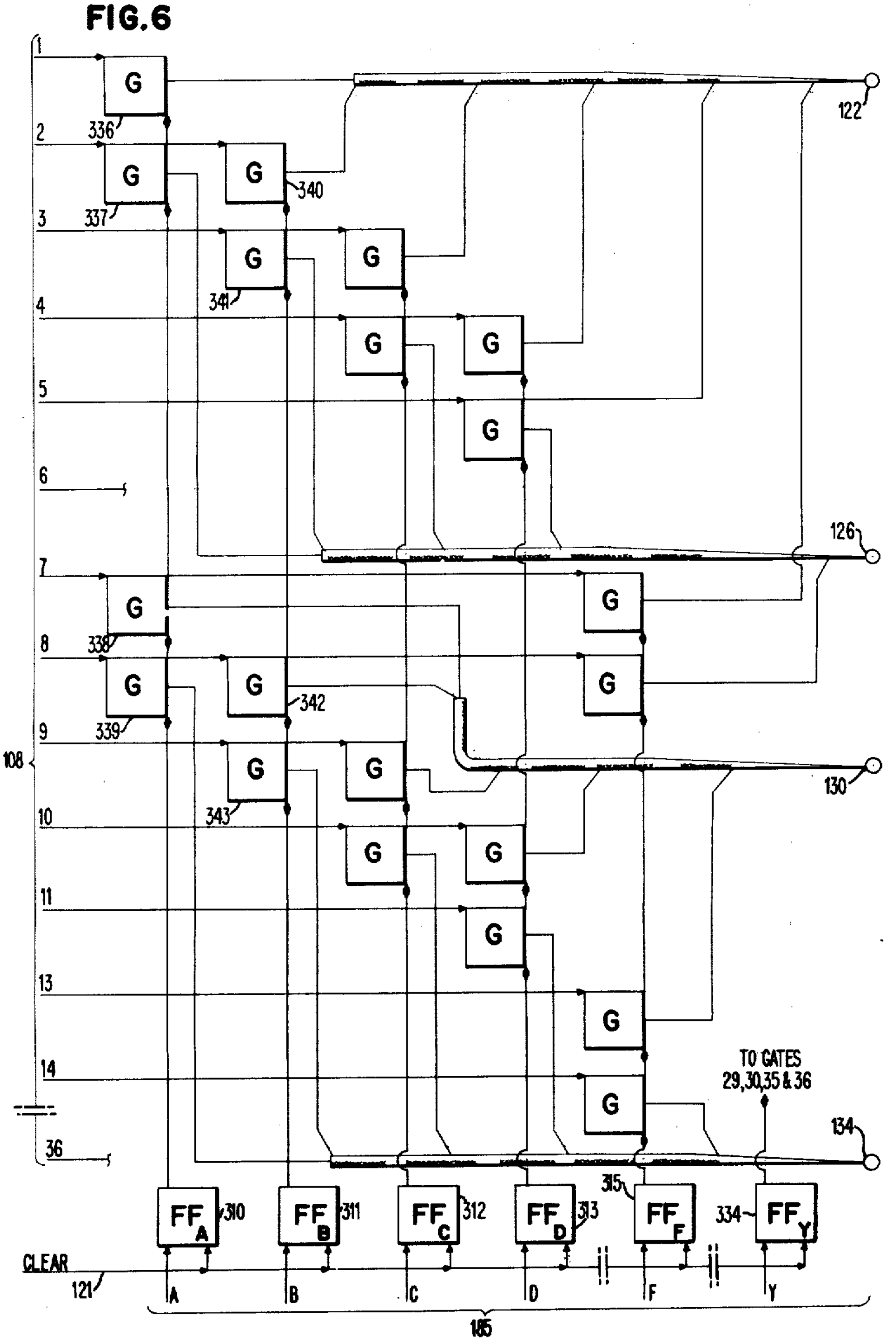

FIG. 4 is a logical block diagram of the circuitry of the Data Present Register, the 3/4 Matrix and the Search Chain, indicated as blocks 190, 196 and 188 respectively in FIG. 2;

FIG. 5 is a logical block diagram of the Input Gates circuitry indicated as block 104 in FIG. 2;

FIG. 6 is a logical block diagram of the Switch Matrix circuitry indicated as block 106 in FIG. 2;

FIG. 7 is a logical block diagram of the Input Control circuitry indicated as block 118 in FIG. 2; and FIG. 8 is a logical block diagram of the Write-Read Control circuitry indicated as block 140 in FIG. 2.

Throughout the following description and in the accompanying drawings there are certain conventions employed which are familiar to certain of those skilled in the art. Additional information concerning those conventions is as follows:

In the Block Diagram figures of the drawing a conventional filled-in arrowhead is employed on lines throughout the drawing to indicate (1) a circuit connection (2) energization with positive pulses and (3) the direction of pulse travel which is also the direction of control. A diamond-shaped arrowhead indicates (1) a circuit connection and (2) energization with a D.C. level. Cables which are used to transfer data are shown as two parallel lines with the arrowheads at one end thereof and at some point intermediate the ends of those cables, the two parallel lines are widened in the form of a circle. A number appears within the circle which indicates the number of conductors within the cable.

Bold face character symbols appearing within a block symbol identify the common name for the circuit represented, that is, FF identifies a flip-flop, G a gate circuit, "&" a logical AND circuit, OR a logical OR circuit, and so forth. A variety of circuits for the performance of each of these functions is known in the art. Suitable circuits are shown and described in the copending application Serial No. 414,459, now Patent No. 2,994,478 entitled Electronic Digital Computer, filed in the name of B. L. Sarahan et al. on March 5, 1954 and assigned to the same assignee as the present application.

Figure 1:
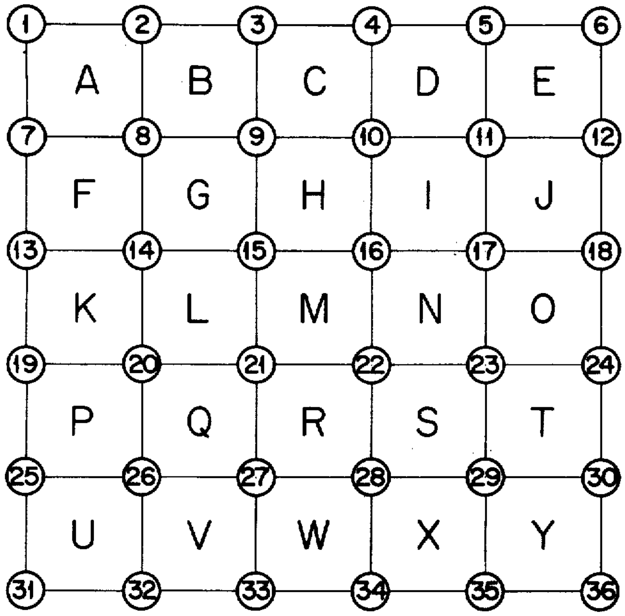

An arrangement of thirty-six signal time of arrival (TOA) sites is diagrammatically illustrated in FIG. 1. These sites are indicated by small circles and are additionally designated by a numeral within the circle. As explained in the description of a similar system in the aforementioned application S.N. 609,414, a group of four adjacent TOA sites define a sector, which upon receipt of a signal from a mobile craft, enables the determination of the craft's location by means of time differences between signal arrival at the four sites. Thus, the grid of thirty-six TOA sites defines a total of twenty-five sectors. These sectors are indicated in FIG. 1 by the generally rectangular areas and are identified particularly by the letter within the area. Thus, the sector G is defined by receiving sites 8, 9, 14, and 15.

As explained in the aforementioned application S.N. 609,414, and particularly in conjunction with FIG. 5 thereof, the time of arrival of a signal from a mobile craft is recorded in binary form at each of the four stations in a sector. The information is then transmitted to the central computer system, appropriate corrections and computations are made, and the resultant positional determination is displayed or otherwise appropriately utilized.

A craft within sector G. for example would generate a signal which would be received by stations 8, 9, 14, and 15. Thus, the data generator comprising the four stations of sector G would have sufficient information such that the computer could make a position determination. However, the same signal might also be received by stations 1, 2, 3, 4, 7, 10, 13, 16, 19, 20, 21, and 22, for example, and sectors A, B, C, F, H, K, L, and M would also have sufficient information available for the computer to make a position determination.

In order to eliminate duplication of processing of this positional information, an input system is provided which selects one data generator, preferably on the basis of computed results, and transfers the information from that data generator to the computer for processing. If no such computed criterion has been established the input system rapidly searches or interrogates the data generators in a preferred order and information from the first sector which reports information avalaible in proper form is transmitted to the computer for processing. Thus, in the above example, assuming that the sectors were searched as consecutively lettered the input system would transmit the data from sector A to the computer for processing. The craft reporting is then located in sector G and the computer will automatically select, through the input system, the stations of sector G as the data generator to report on this craft in the next cycle.

The operation of the input system may be understood with reference to FIG. 2. The time of arrival (TOA) data in digital form is serially transferred to the Input Buffer Registers, indicated generally by block 100, over the cable 102. The information transmitted from the TOA stations may also include altitude information from the craft and a parity bit, for example. In this embodiment the transmitted information from each station consists of nineteen bits and the Input Buffer Registers are thirty-six in number, each having nineteen stages. These registers are similar to the shift register 61 shown in FIG. 5 of the aforementioned copending application S.N. 609,414. These registers may be any flip-flop register which functions in general as described in Richards, Arithmetic Operations in Digital Computers, pp 144–148 or specifically a magnetic core register of the type disclosed in application S.N. 502,634, entitled Counter Circuit, filed in the name of H. K. Rising et al. on April 20, 1955.

When a sector has been selected, the Input Gates circuitry 104 and the Switch Matrix circuitry 106 are appropriately conditioned such that the digital data is serially transferred from four registers of the Input Buffer Register 100 over lines in cable 108 through the Switch Matrix 106 into the Input Registers 110, 112, 114 and 116.

The shifting of information from the Input Buffer Registers to the Input Registers is under supervision of the Input Control circuitry 118. The Input Control circuitry includes a distributor, stepped by clock pulses from a synchronizing Clock 120, which generates pulses. These pulses are passed through the Input Gates to step the Input Buffer Registers so that the TOA data stored therein is transferred in a serial manner. Upon completion of the data transfer the Input Gates and the Switch Matrix are cleared by a pulse generated by the Input Control Circuitry on line 121.

The Switch Matrix functions to distribute data from the four selected Input Buffer Registers to the Input Registers in a predetermined arrangement to simplify the necessary computing operation. In the illustrated embodiment this distribution is as follows: data from the station in the upper left corner of the selected sector, as viewed in FIG. 1, to Input Register 110 over one of the conductors of cable 122 and through OR Circuit 124; from the station in the upper right corner to Input Register 112 over one of the conductors of cable 126 and through OR Circuit 128; from the station in the lower left corner to Input Register 114 over one of the conductors of cable 130 and through OR circuit 132; from the station in the lower right corner to Input Register 116 over one of the conductors of cable 134 and through OR Circuit 136.

The information stored in the Input Registers, together with Sector Identification Information, is then transferred to the TOA Drum 138 under the supervision of the Write-Read Control circuitry 140.

The TOA Drum is a magnetic drum which is driven at a constant angular velocity. Fixed magnetic heads are held rigidly in place parallel to the longitudinal axis of the drum. Information may be transferred to and from the magnetic surface of the drum by writing binary information on the drum in the form of small electromagnetic flux patterns and reading such patterns.

There are thirty-eight Write-heads associated with the input side of the drum and twenty-six Read-heads associated with the output side of the drum. A drum channel is associated with each magnetic head. In addition, there is a timing channel and an index channel. These channels are circumferential bands of drum surface. If the small electromagnetic flux pattern written by a magnetic head is positive it may be designated as a binary ONE and if flux pattern is negative it may be designated as binary ZERO. Once such information is written on the drum it remains stored there unless another bit is written over it or it is deliberately erased. Reading from the drum does not distort or alter the bits recorded on the drum surface. Those portions of the drum surface which are under the magnetic heads on the input side or on the output side at any one give time are called a register. Information in the form of a word composed of a plurality of bits is transferred through the magnetic heads to the drum surface in parallel manner. The word transferred to the drum by the input system is composed of 38 bits and the word read from the drum by the input system is composed of 26 bits.

The timing channel has a magnetic spot written into it for each drum register. As the drum rotates this timing channel is sensed by a Read head and timing signals are produced which may be utilized to control the information transfer and drum reading and writing operations. As a magnetic spot passes under a Read head an output in approximately the form of a sine wave is induced in the Read head. This output is used to produce a pulse for each zero crossing of the sine wave. Each of the two pulses produced by each spot is delayed by a given amount so that a total of four pulses equally spaced in time result are generated for each drum register. These pulses are designated drum timing pulses (DTP).

A second timing channel is denominated in the Index channel and it is read by an associated Read head in a like manner. This channel has been similarly magnetized with a succession of equidistantly spaced magnetized spots but with the difference that one of these spots is magnetized with opposite magnetic polarity to the other spots of this channel. When this uniquely magnetized spot passes beneath the associated Read head a sine wave of opposite phase is produced and that serves to identify the associated register as a reference point on the drum. The addressing of all registers may be made relative to this reference or index point.

The Write-Read Control circuitry 140 is operated by drum timing pulses from the TOA Data Drum 138 over line 143. A Ready to Write Pulse, generated by the Input Control 118 after completion of the data transfer from the Input Buffer Registers to the Input Registers, is transferred to the Write-Read Control over line 142 to initiate its operation. A synchronizing and search operation within the Write-Read Control locates the proper drum registers as hereinafter explained to receive the information to be written onto the drum. The Write-Read Control circuitry then generates a first pulse on line 144 which conditions gates in the Sector Identity Register 145 to transfer the information stored therein over cable 146 and through OR Circuit 148 to the Write Register 150. A pulse on line 152 from the Write-Read Control then conditions the Write Register to transfer the Sector Identity Information to the Write Heads 154 for writing on the TOA Drum 138. The Write-Read Control circuitry next generates a pulse on line 156 which conditions gates in Input Registers 110 and 112 and applies the information stored therein in parallel transfer to the Amplifier Gates 158. The pulse on line 156, delayed by delay unit 160, then conditions the gates 158 to pas the data through the OR circuit 148 to the Write Gates 150. A Write pulse on line 152 then transfers the information to the Write heads 154 for writing in the next succesive drum register. A third control pulse, developed by the Write-Read circuitry on line 161 transfers the information from the Input Registers 114 and 116 through the Amplifier Gates 162 and the OR circuit 148 to the Write Gates. The subsequent Write pulse, on line 152, applies this information to the Write Heads for storage in a third successive register on the TOA Drum.

Thus, the sector identification and TOA data for a specific craft are stored in the TOA buffer storage drum. A suitable data processing machine or computer 164 extracts the information from the drum as required and after computation of the craft's location the computer writes, on an output register of the TOA Drum assigned to that specific craft, the pertinent sector identification information. This information is written prior to the occurrence of the next time slot assigned to that craft. The computer may be a special purpose computer or a general purpose computer of the type disclosed in the copending application Serial No. 414,459 entitled Electronic Digital Computer, filed in the name of B. L. Sarahan et al. on March 5, 1954 and assigned to the same assignee as the present application.

As a final pulse in its operative cycle, the Write-Read Control circuitry generates a pulse on line 166 which samples the Read Gates 168 and transfers the information in the drum register then under the Read Heads 170 of the TOA Drum to the Sector Identity Register 145 over cable 172. This information identifies the sector in which the craft next reporting should be located, provided the computer has generated such information with respect to it. A pulse, accompanying the sector identification information is transmitted to the Mode circuitry 174 on line 175. No pulse is transmitted on line 175, however, if there is no sector identification information stored in the particular drum register. The input circuitry thus is conditioned to select a data generator in the next time slot in response to and on the basis of information calculated by the computer.

The selection of a data generator for information transfer is accomplished in the following manner: The synchronizing Clock 120 generates an Index pulse on line 176 at a predetermined time after the beginning of the current time slot. The delay of the Clock Index pulse is provided to allow sufficient time for TOA data to be received and coded by the receiving stations and transmitted to the Input Buffer Registers. The Index pulse samples the Mode circuitry 174 and if a sector identification has been written into the Sector Identification Register 145 a pulse is passed on line 178 to the Sector Identification Register. The pulse gates out this identification information on a line in a cable 180 to condition the four flip-flops corresponding to the selected sector in the Input Gates circuitry 104 through OR circuit 182 and also to condition a single flip-flop in the Switch Matrix circuitry 106 through OR circuit 184. The information transfer then proceeds as above described under supervision of the Input Control 118.

However, if no sector has been selected by the computer, the Clock Index pulse which samples the Mode circuitry is passed on line 186 to sample the Search Chain 188. Accompanying TOA Data from each station is a synchronizing pulse which is transferred through the Input Buffer Registers to the Data Present Register 190 over a line in cable 192. The Data Present Register comprises a group of flip-flops, each one corresponding to a TOA station. Thus, if a station has transmitted Time of Arrival Data to the Input Buffer Registers the sync pulse associated therewith sets the corresponding flip-flop in the Data Present Register and thus provides a current level that indicates the presence of information from that TOA station. These levels are transferred over corresponding lines in cable 194 to the Three out of Four (3/4) Matrix 196 which correlates, in the appropriate manner, and indicates to the Search Chain circuitry, by means of pulses on corresponding conductors of cable 198, which sectors contain sufficient information for the computer to make a position determining calculation. The search pulse from the Mode circuitry is passed serially through the sector units of the Search Chain until a sector having sufficient information is discovered. The identification of this sector is passed on a conductor of cable 200 through the OR circuit 182 to set the four corresponding flip-flops in the Input Gates 104; on a conductor in cable 201 to the Sector Identity Register 145 for storage therein and on a conductor of cable 203 through OR circuit 184 to set a flip-flop in the Switch Matrix 106. The Input Gates circuitry and the Switch Matrix circuitry thus are appropriately conditioned and a Data Transfer operation, under the supervision of the Input Control circuitry, proceeds as above described. Upon completion of the Data Transfer operation, a clear pulse on line 121 is applied to the Data Present Register 190 to clear the flip-flops therein and ready the circuit for the next cycle.

In the event that the search operation reports no sectors containing sufficient information for a position computation a pulse is developed on line 202 which actuates the Input Control circuitry to inhibit the Transfer operation, to clear the Data Present Register, and to condition the Write-Read Control for a reading operation.

Thus, the input system includes a data generator selector which is actuated in response to computed information and which enables the transfer of data from the selected generator over selected transmission lines to buffer storage. The data is then available to the computer for processing.

Various of the subcircuitries of the preferred embodiment are illustrated in FIGS. 3 through 8.

Figure 3:
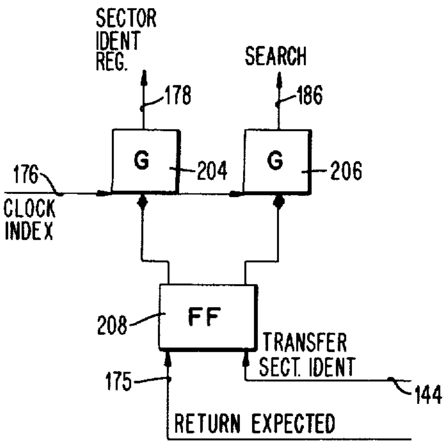
FIG. 3 is a schematic diagram in logical block form of the Mode circuitry indicated as block 174 in FIG. 2.

At a predetermined time after the beginning of each time slot (the period during which a specific mobile craft reports, or sends a signal to the sector receiving stations and TOA information is placed in computer buffer storage), a Clock Index pulse is applied to the Mode circuitry 174, shown in FIG. 3.

The Clock Index pulse applied over line 176, samples the gate tubes 204 and 206. The pulse is passed by the gate which is conditioned by an output level from the flip-flop 208. The flip-flop is set by a pulse on line 175 which is generated if sector identification information is read from the TOA Drum. If the flip-flop 208 is set gate 204 is conditioned and the index pulse is passed to the Sector Identity Register on line 178 as a gating pulse. If the flip-flop is not set gate 206 is conditioned and the index pulse is passed on line 186 as a Search pulse. The flip-flop 208 is reset each cycle by the Transfer Sector Identity pulse on line 144.

The Data Present Input Register 190, the 3/4 Matrix 196 and the Search Chain 188 are illustrated in FIG. 4.

Each of the conductors in cables 108, 125 and 192 are associated with a receiving station. The relationship is indicated by the number of the receiving station (as indicated in FIG. 1) placed adjacent to its respective conductor in FIGS. 4, 5, and 6. Similarly, each conductor in cable 183, 185 and 200 is associated with a sector and this is indicated by the sector letter placed adjacent the conductor.

The Data Present Register 190 comprises a group of flip-flops 211 through 246, one each corresponding to a receiving station. A mobile craft may send a signal which is received by a plurality of stations and this information is transferred in digital form to the input Buffer Registers. The fact that such information is present from a receiving station is indicated in Data Present Register by a pulse on a line in cable 192 which sets the associated flip-flop. Thus, if a report is received by Sector A (defined by sites 1, 2, 7, and 8) the associated flip-flops 211, 212, 217, and 218 will be set. At the end of the data transfer cycle a Clear pulse, generated by the Input Control circuitry, is passed over line 121 to clear all the flip-flops in the Data Present Register.

The 3/4 Matrix 196 comprises a group of four three-input AND circuits and an OR circuit associated with each secton. Thus, AND circuits 250, 251, 252 and 253 and OR circuit 254 are associated with Sector A, AND circuits 255, 256, 257, 258 and OR circuit 259 are associated with Sector B, etc. The inputs of AND circuit 250 are connected to flip-flops 211, 212, and 217; the inputs to AND circuit 251 connected to flip-flops 211, 212, and 218; the inputs to AND circuit 252 are connected to flip-flops 211, 217, and 218; and the inputs to AND circuit 253 are connected to flip-flops 212, 217 and 218. These AND circuits, which are associated with Sector A, thus are connected to the flip-flops that are associated with the stations which define Sector A, i.e., sites 1, 2, 7 and 8. One of the four AND circuits associated with Sector A will have an output if a signal from the reporting craft is received by three of the four stations which define that sector. This output level is passed through the OR circuit 254 to the Search Chain 188. The other Matrix circuits operate in a similar manner. If the criteria for reporting should be changed, as for example, a requirement that all four stations of a sector must receive the signal, the Matrix circuitry may be modified in the appropriate manner.

The Search Chain circuitry 188 is connected to the Matrix circuitry. Each element of the Search Chain circuitry associated with a sector comprises two gates and an inverter circuit. (The inverter circuitry may comprise an overdriven amplifier, the output of which is applied to a cathode follower. This circuitry provides a D. C. inverter which produces a negative output signal when the input signal is zero or positive and a positive output signal when the input signal is negative.) The order of search may be varied as desired. For example, it might be desirable, in an aircraft control system, to give preference to those sectors which report returns from the vicinity of an airfield as new craft would be entering the system from such locations. Another possible criterion would be to give preference to the sectors along the perimeter of the grid, thus enabling the prompt reporting of craft entering the grid system from outside. In FIG. 4 the Search Chain has been arbitrarily connected to search the Sectors A through Y in that order.

The Search Chain circuitry associated with Sector A comprises gate tubes 260 and 261 and an inverter 262. The Search Chain circuitry associated with Sector B comprises gate tubes 263 and 264 and inverter 265. The circuitry associated with the other sectors is similar. Where three out of four stations associated with Sector B have received information and transferred it to the Input Buffer Registers, OR circuit 259 will have an output. This output will condition gate tube 263 and inverter 265. Assume that a signal has not been received by two stations associated with Sector A. In such event, OR circuit 254 will not have an output and gate tube 260 will not be conditioned. However, inverter 262 will condition gate tube 261. Under these circumstances a search pulse from the Mode circuitry on line 186 will sample gates 260 and 261 and will be passed by gate 261 as a sampling pulse to gates 263 and 264. As OR circuit 259 has an output, gate 263 is conditioned and the search pulse is passed as an output through gate 263 over line B in cable 200. In this manner a sector is selected for data transfer to the computer. The Input Gate circuitry and the Switch Matrix circuitry are appropriately conditioned and the Sector Identity is entered in the Sector Identity Register. If the search pulse is passed through the complete Search Chain circuitry, indicating no sector has data available, the pulse is transmitted on line 202 to inhibit the execution of a transfer operation under the supervision of the Input Control circuitry.

The Input Gates circuitry 104 is shown in FIG. 5. The function of this circuitry is to decode the sector identification pulse, which is received through the OR circuit 182, into the appropriate station identification values, such that the information from that portion of the Input Buffer Registers associated with that sector may be transferred over cable 108 to the Input Registers. Thus, a sector identification line is connected to four of the flip-flops, through OR circuits as required. For example, the Sector A line is connected to flip-flops 271, 272, 277 and 278 and the Sector B line is connected to flip-flops 272, 273, 278 and 279. The resultant output levels of the four set flip-flops condition the gates associated with the four registers of the selected sector. Shift pulses, applied over line 123 from the Input Control circuitry, are transferred through the conditioned gates and over lines in cable 125 to shift the information from the selected Input Buffer Registers in a serial transfer. Upon completion of the shifting operation a clear pulse on line 121 from the Input Control circuitry clears the flip-flops in the Input Gates circuitry, preparing the circuitry for the next information transfer operation.

The Switch Matrix circuitry 106 is shown in FIG. 6. This Matrix is utilized to place information from the stations associated with the selected sector in the desired Input Registers as described above. The Switch Matrix comprises a flip-flop register including flip-flops 310–334, one associated with each sector. The flip-flops are each connected to a different conductor in cable 185 from the OR circuit 184 so that they may be set by a current level applied to such conductor. Four gates are associated with each flip-flop and are conditioned whenever the associated flip-flop is set and each gate is sampled by signals transferred on a line in cable 108. These gates channel the TOA Data from the four selected Input Buffer Registers to the proper Input Registers.

For example, the flip-flop 310, associated with sector A, when set, raises an output level which conditions gates 336, 337, 338, and 339. Information transmitted from the Input Buffer Registers over the conductors in cable 108 associated with the stations 1, 2, 7, and 8 is passed through the Switch Matrix to conductors in cables 122, 126, 130 and 134, respectively. When the flip-flop 311, associated with sector B, is set, the resultant output level conditions gates 340, 341, 342 and 343, which are pulsed by signals from stations 2, 3, 8, and 9, respectively. The conditioned Switch Matrix gates channel the data onto conductors in cables 122, 126, 130 and 134 respectively, It is to be noted that when flip-flop 311 is conditioned instead of flip-flop 310 the information transferred over cable 108 from station 2 is transmitted over a conductor in cable 122 rather than a conductor in cable 126 and information transferred from station 8 is placed on a conductor of 130 rather than a conductor in cable 134. Flip-flop 334, associated with sector Y, when set, has an output level which conditions gates (not shown) associated with stations 29, 30, 35, and 36. Information from those stations is transmitted on lines 122, 126, 130 and 134. respectively under that condition. The flip-flops associated with the other sectors and their four associated gates tubes operate in a similar manner.

The Switch Matrix enables the transmission of TOA data from the Input Buffer Registers to the Input Registers according to the location of the sending station in the selected sector. Such selected transmission places the TOA data in a predetermined and known order preparatory to storage on the TOA Drum and thus enables the programming of the computer to be simplified.

The Input Control circuitry 118 is shown in FIG. 7. This circuitry controls the shifting of information from the Input Buffer Registers to the Input Registers. The Clock Index pulse on line 176 sets flip-flop 350 and is passed through delay unit 352. The delay unit 352 is provided to delay the Index pulse a sufficient time to permit a search operation to be accomplished, if necessary. The output from the delay unit 352 is applied to the gate unit 354, which is conditioned by the output from the set flip-flop 350.

If, as a result of a search operation, a No Returns pulse is developed on line 202, the pulse clears flip-flop 350 through OR circuit 346. The conditioning level thus is removed from gate 354 before the Index pulse is passed from delay unit 352. The No Returns pulse is also passed through OR circuit 364 and on line 121 to clear the Data Present Register and through OR circuit 366 to generate a Ready-to-Write pulse on line 142.

If, however, the Index pulse is passed by gate 354 it sets flip-flop 358 and the resultant output level conditions gate 360 to pass clock pulses on line 177 to the Distributor 362. The Distributor channels nineteen of the clock pulses onto line 123 which are passed through the Input Gate circuitry as shift pulses to transfer the TOA data, stored in the Input Buffer Registers, through the Switch Matrix to the Input Registers. At the completion of the shifting operation a Ready-to-Write pulse is channeled by the Distributor through OR circuit 366 and over line 142 to the Write-Read Control circuit and then a Clear pulse is channeled onto line 121. The latter pulse also resets flip-flops 350 and 358.

The Write-Read Control circuitry 140 is diagrammatically illustrated in FIG. 8. Operation of this circuitry is initiated by the Ready-to-Write pulse from the Input Control circuitry over line 142. This pulse sets flip-flop 370 and the resultant output level conditions gate 372. This gate is sampled by Drum Timing Pulses from the Timing Channel on the TOA Drum which are transmitted to the Read-Write Control circuitry over line 143. The Drum Timing Pulse passed through gate 372 sets flip-flop 374 and the resultant output level conditions gate 376. The next Drum Timing Pulse is passed through gate 376 as a conditioning pulse to the Compare circuitry 378.

The Ready-to-Write pulse, now synchronized with the drum, conditions the Compare circuit to make a comparison between the current time slot as indicated by the Time Slot Counter 380 (stepped by the Clock Index pulse over line 176) and the drum position as indicated by the Angular Position Counter 382.

The Angular Position Counter is utilized to determine at any instant which drum register is under the magnetic heads associated with the TOA Drum 138 and may be any suitable counter which may be cleared, stepped by 1, and the contents transferred when desired. An example of a counter suitable for this purpose is illustrated in the copending application Serial No. 570,199 entitled Electronic Data Processing Machine, filed in the name of H. Ross et al. on March 7, 1956, now Patent No. 2,914,248, and assigned to the same assignee as the present application, (with particular reference to FIG. 41 and the description relative thereto). The Angular Position Counter is cleared to zero by the Index pulse and is advanced a count of one by a DTP pulse associated with each drum register.

The Slot Counter may be a type of binary counter similar to the Angular Position Counter. It is stepped by the clock index pulse, and is advanced a count of three by each input pulse as three input drum registers correspond to each time slot. The Slot Counter retains each value for at least one drum revolution. The drum register address assigned to the current time slot thus is placed in the Slot Counter by the Clock Index Pulse and on receipt of a synchronized Read-to-Write pulse the Write-Read circuitry executes a drum address search operation. For the purpose of locating a particular drum register, the contents of the Angular Position Counter are transferred to a Comparison circuitry at DTP1. The desired drum address is gated into the Comparison circuitry from the Time Slot Counter and when a successful comparison is made this information is utilized to initiate a writing and reading operation.

The output levels (ONES and ZEROS) from the Slot Counter define the selected drum address. There are two two-input AND circuits associated with each numerical order in the binary number representing the drum address. Each output line from the Slot Counter is connected to one input of an AND circuit in the Comparison circuitry 378. The other input of each AND circuit is connected to a level raised by a corresponding flip-flop in the Angular Position Counter. However, for each corresponding order the values of the bit are reversed. In other words, the ZERO side of the lowest order flip-flop in the Slot Counter is connected to one ipnut of an AND circuit whose other input is connected to the ONE side of the corresponding flip-flop in the Angular Position Counter. In this manner, at least one of the AND circuits in the Comparison circuitry will produce an output except when the desired comparison is made.

When the proper comparison is made an initiating pulse is delivered by the Comparison circuitry to the Distributor 384. This pulse also resets flip-flops 370 and 374. The Distributor, as driven by Drum Timing Pulses, then operates to develop certain control pulses. The first pulse developed is a gating pulse on line 144 which enables the transfer of information from the Sector Identity Register to the Write Gates 150. A Write Pulse is then developed by the Distributor 384 and transmitted over line 152 to gate that information from the Write Gates to the Write-Heads 154 for writing on the TOA Drum 138. Subsequent gating pulses on lines 156 and 161 and Write pulses on line 152 transfer the information from Registers 110 and 112, and from Registers 114 and 116 through the Write Register to the TOA Drum. A Read pulse is then developed by the Distributor 384 on line 166 which samples the Read Gate 168 associated with the output circuitry of the TOA Drum. The Distributor is cleared by the Read pulse in preparation for the next Write-Read cycle.

The input system is particularly suitable for transfer of TOA data from receiving stations to buffer storage for subsequent utilization by a computer. The data generators may be selected under computer generated criteria or, in the absence of such criteria, on the basis of availability of suitable information at the generators. Further, the system transmission means include provision for channel selection which enables the storage of data in a preferential manner.

While a preferred embodiment of the invention has been shown and described, it is not intended that the invention be limited thereto, or to details thereof, and departures may be made therefrom within the spirit and scope of the invention as defined in the following claims.

We claim:

1. In an automatic position reporting system for mobile craft including a digital computer and a plurality of fixed position receiving stations each adapted to receive and record as sets of binary signals the times of arrival of pulses transmitted at successive intervals by said craft, said stations adapted to be variously arranged in groups containing a predetermined number of stations, certain of said stations being in more than one of said groups, an input system adapted to translate binary signals from a selected group of said stations to said computer for position determination computations during each interval, comprising a storage device having a plurality of addressable registers for storing sets of binary signals from said receiving stations during each interval, one of said registers being associated with each said station, transmission means adapted to translate binary signals from said registers to said computer for processing, and selection means for selecting the registers associated with a group during each interval and actuating said transmission means for translation of signals from the registers of the selected group to said computer comprising means, responsive to computer generated address signals, adapted to select a preferred group in accordance with a signal generated as a result of a computation performed by said computer on time of arrival information signals previously translated to said computer and alternate means operative, in the absence of said computer generated address signal, to sample combinations of said registers corresponding to said station groups for selecting a group containing suitable signals for processing.

2. The system as claimed in claim 1 and further including storage means associated with said computer, said storage means containing a plurality of areas equal in number to the number of stations in a group, said selection means being adapted to control said transmission means whereby signals from selected registers are translated to said storage areas in accordance with their relative positions in said selected group.

3. In combination with a data processing system including a digital computer, a data input system for said computer comprising a plurality of addressable data generators which provide successive sets of data signals, transmission means adapted to translate data signals from said data generators to said computer including control means for selectively varying the order of translation of the data signals to said computer, and selection means for selecting a data generator in accordance with address information signals generated as a result of computer operations on data signals previously translated to said digital computer and actuating said transmission means for translation of signals from said selected data generator to said computer.

4. The input system as claimed in claim 3 wherein said transmission means includes a plurality of transmission lines and said control means includes switch means associated with each data generator for controlling the channeling of data onto said plurality of lines, said switch means being operative in response to said selection means.

5. The system as claimed in claim 3 wherein said selection means includes means operative in the absence of said address information signals to search the data provided by said generators and select a data generator which provides data signals suitable for translation to said computer by said transmission means.

6. In combination with a digital computer, a data input control system comprising a plurality of addressable storage devices adapted to store, at successive intervals, sets of signals representative of data, transmission means adapted to translate signals from selected ones of said storage devices to said computer, first selection means, normally operative during each said interval, for selecting a storage device in accordance with address information generated by said computer in response to data signals previously translated to said computer and for actuating said transmission means to translate data signals from the selected device to said computer, and second selection means operative during each said interval in the absence of the computer generated address information for sampling said devices serially and actuating said transmission means, upon detection of a device that contains data signals suitable for processing by said computer, for translating data signals from said detected device to said computer.

7. The system as claimed in claim 6 and further including transmission means adapted to selectively vary the order of translation of the selected data signals to the computer, said transmission means being controlled by the operative selection means.

8. The system as claimed in claim 6 and further including storage means associated with each said device adapted to store signals indicative of the availability in the corresponding storage device of suitable signals for translation to said computer from that device during each of said intervals, and indicating means responsive to said stored signals adapted to indicate the availability of suitable signals in a preferred order, wherein said second selection means is adapted to sample said indicating means and to select signals from the first device which contains suitable signals as indicated by said indicating means.

9. In a data processing system including a digital computer, a plurality of addressable data sources and means to provide at successive intervals sets of signals representative of data from said sources, said sources adapted to be arranged in groups and certain of said sources being in more than one of said groups, an input system adapted to translate signals from a selected group of the sources to said computer during each interval comprising transmission means adapted to translate signals from said sources to said computer for processing, selection means responsive to address information signals generated as a result of computer operation on data signals previously translated to said computer to select a preferred group of sources and to actuate said transmission means for translation of signals from the selected group of sources in parallel to said computer, and control means for selectively varying the order of translation of the selected data signals to said computer in accordance with the relative positions of the data sources in said selected group.

10. In a data processing system including a digital computer, a plurality of addressable data sources, and means to provide at successive intervals sets of signals representative of data from said sources, said sources adapted to be arranged in groups and certain of said sources being in more than one of said groups, an input system adapted to translate signals from a selected group of the sources to said computer during each interval comprising transmission means adapted to translate signals from said sources to said computer for processing, first selection means responsive to address information signals generated as a result of computer operation on data signals previously translated to said computer to select a preferred group of sources and to actuate said transmission means for translation of signals from the selected group of sources in parallel to said computer, signal availability indicating means comprising first means to indicate the availability of signals suitable for processing from each said addressable data source and second means for combining said source signal availability indication means into group signal availability indications, and second selection means operative during each interval in the absence of computer generated address information signals to sample the group signal availability indications serially in a preferred order and to actuate said transmission means for translation of signals from the first detected group of sources indicated to have available signals suitable for processing to said computer.

11. A data input system for a digital computer comprising a plurality of buffer storage registers adapted to receive sets of signals represenative of data in successive intervals, each set of received data signals being stored in a corresponding buffer storage register during each interval, said sets of data signals being adapted to be arranged in addressable groups with certain of said sets of data signals being in more than one of said groups, computer input storage means arranged to receive sets of signals corresponding to a group, transmission means adapted to translate the sets of signals corresponding to a group from said input buffer storage registers to said computer input storage means, said transmission means including switch matrix means for channeling the data signals from the registers associated with a selected group to said computer input storage means in accordance with the relationship of the sets of signals in the selected group, first selection means responsive to address information signals generated as a result of computer operations on data signals previously translated to said computer to select the input buffer registers associated with a group specified by said computer generated signals and to actuate said transmission means for translation of the data signals from the registers associated with said specified group through said switch matrix to said computer input storage means, signal set availability indicating means associated with each register adapted to indicate the availability in the associated buffer register of signal sets suitable for transmission, means to combine signals from said signal set indicating means in accordance with the arrangement of said groups to provide indications of the availability of groups of signals suitable for transmission to said computer input registers, and second selection means operative in the absence of said computer generated address information signals to sense said group signal indications serially in a preferred order and to actuate said transmission means to translate sets of signals from the first group sensed to have suitable signals for translation through said switch matrix means to said computer input storage means.

12. In combination with a data processing system including a digital computer, a data input system for said computer comprising a plurality of addressable data generators which provide successive sets of data signals, transmission means adapted to translate data signals from said data generators to said computer, and selection means including first means for selecting a data generator in accordance with address information signals generated as a result of computer operations on data signals previously translated to said digital computer and actuating said transmission means for translation of signals from said selected data generator to said computer, and second means operative in the absence of said adress information signals to search the data provided by said generators and select a data generator which provides data signals suitable for translation to said computer by said transmission means.

13. A data input system for a digital computer comprising a plurality of data sources adapted to provide signals representative of data for processing by said computer, transmission means adapted to translate data signals from said sources to said computer, first selection means for selecting a source in accordance with address information signals generated as a result of computer operations on data signals previously translated to said computer and actuating said transmission means for translation of signals from said selected source to said computer, and second selection means operative in the absence of said computer generated address information signals for selecting a source and actuating said transmission means for translation of signals from that selected source to said computer.

References Cited by the Examiner

UNITED STATES PATENTS

| | | | |
|---|---|---|---|
| 2,564,294 | 8/51 | Belcher | 340—183 X |
| 2,680,240 | 6/54 | Greenfield | 340—183 |
| 2,739,301 | 3/56 | Greenfield | 340—172.5 X |
| 2,910,238 | 10/59 | Miles | 340—172.5 X |
| 3,034,101 | 5/62 | Lowe | 340—172.5 |

MALCOLM A. MORRISON, *Primary Examiner.*

CHESTER L. JUSTUS, FREDERICK M. STRADER, IRVING L. SRAGOW, *Examiners.*